United States Patent
Korevaar et al.

(10) Patent No.: US 8,098,764 B2
(45) Date of Patent: Jan. 17, 2012

(54) MILLIMETER WAVE RADIO WITH PHASE MODULATION

(75) Inventors: Eric Korevaar, La Jolla, CA (US); Richard Chedester, Whately, MA (US); Paul Johnson, El Cajon, CA (US)

(73) Assignee: Trex Enterprises Corp., San Diego, CA (US)

(*) Notice: Subject to any disclaimer, the term of this patent is extended or adjusted under 35 U.S.C. 154(b) by 832 days.

(21) Appl. No.: 12/228,114

(22) Filed: Aug. 7, 2008

(65) Prior Publication Data
US 2010/0034316 A1 Feb. 11, 2010

Related U.S. Application Data

(60) Provisional application No. 60/964,003, filed on Aug. 7, 2007.

(51) Int. Cl.
*H04L 27/20* (2006.01)

(52) U.S. Cl. .............................. 375/308; 375/295

(58) Field of Classification Search ............... 375/295, 375/308, 219; 455/78, 73, 41.2, 500; 398/115
See application file for complete search history.

(56) References Cited

U.S. PATENT DOCUMENTS

| | | | |
|---|---|---|---|
| 7,103,279 B1 * | 9/2006 | Koh et al. | 398/115 |
| 7,915,935 B1 * | 3/2011 | Menon et al. | 327/159 |
| 2002/0025786 A1 * | 2/2002 | Brady et al. | 455/78 |
| 2003/0152140 A1 * | 8/2003 | Antoniak | 375/219 |
| 2005/0271125 A1 * | 12/2005 | Chedester et al. | 375/219 |
| 2006/0002455 A1 * | 1/2006 | Johnson et al. | 375/219 |
| 2008/0280577 A1 * | 11/2008 | Beukema et al. | 455/190.1 |
| 2009/0181622 A1 * | 7/2009 | Hardacker | 455/73 |

OTHER PUBLICATIONS

Val Dyadyuk, John D. Bunton, Joseph Pathikulangara, Rodney Kendall, Oya Sevimli, Leigh Stokes and David A. Abbott, "A Multigigabit Millimeter-Wave Communication System With Improved Spectral Efficiency", CSIRO ICT Centre, Marsfield, Sydney, Australia, IEEE, 2007.*

* cited by examiner

*Primary Examiner* — Aristocratis Fotakis
(74) *Attorney, Agent, or Firm* — John R. Ross

(57) ABSTRACT

Millimeter wave radio with phase modulation. In preferred embodiments each of the two radios in a link uses a single aperture to transmit radiation in one of the two bands, and receive radiation in the other of the bands. The counterpart radio used to form a link preferably is almost identical, except for the interchange of the transmit and receive frequencies. Preferred embodiments utilize a modulation scheme in which the radios each receive on-off keyed data and transmit the on-off keyed data encoded in a millimeter wave carrier wave with binary phase shift keying.

19 Claims, 5 Drawing Sheets

FIG. 2  PRIOR ART QPSK MMWAVE RADIO

MILLIMETER WAVE RADIO WITH PHASE MODULATION

CROSS REFERENCE TO RELATED APPLICATIONS

This application claims the benefit of U.S. Provisional Patent Application Ser. No. 60/964,003 filed Aug. 7, 2007.

BACKGROUND OF THE INVENTION

High data rate, point-to-point radio systems are used for a number of applications including enterprise network connectivity and telecommunications backhaul, first mile, and last mile connections. In general, the higher amount of Radio Frequency (RF) bandwidth that is allocated to the radio system, the higher the amount of data throughput that can be accommodated. In addition, the higher the underlying frequency of the RF carrier, the more directed the communications beam can be for a given size of antenna. Therefore, millimeter wave RF frequencies (from 30 GHz to 300 GHz) are used for point-to-point communications links in spite of higher rain attenuation than is suffered by lower frequencies because they have higher available allocated bandwidths (supporting high data rates), and because more radio links can be placed in a given area because of the narrower beams.

In addition to a Federal Communications Commission (FCC) regionally licensed millimeter wave band between 38.6 GHz and 40 GHz used for communications, there is a large unlicensed band from 57 GHz-64 GHz, and licensed bands extending from 71-76 GHz, 81-86 GHz and 92-95 GHz. A subsidiary of Applicants' assignee manufactures and sells FCC licensed and certified radio links in the 71-76 GHz and 81-86 GHz millimeter wave bands operating at data rates of 1.25 Gbps and higher. Applicants' assignee has a number of patents issued and pending covering various aspects of these radios and their applications. Some of these patents and pending patent applications include the following, all of which are incorporated herein by reference:

| Pat. No. | Issued | Title |
| --- | --- | --- |
| 6,556,836 | Apr. 29, 2003 | Point-to-Point Millimeter Wave Dual Band Free Space Gigabit per Second Communication Link |
| 6,587,699 | Jul. 01, 2003 | Narrow Beamwidth Communication Link with Alignment Camera |
| 6,611,696 | Aug. 26, 2003 | Method and Apparatus for Aligning the Antennas of a Millimeter Wave Communication Link using a Narrow Band Oscillator and a Power Detector |
| 6,665,546 | Dec. 16, 2003 | High Speed Point-to-Point Millimeter Wave Data Communication System |
| 6,714,800 | Mar. 30, 2004 | Cellular Telephone System with Free Space Millimeter Wave Trunk Line |
| 7,062,293 | Jun. 13, 2006 | Cellular Telephone System with Free Space Millimeter Wave Trunk Line |
| 7,065,326 | Jun. 20, 2006 | Millimeter Wave Communication System with a High Performance Modulator Circuit |

| Patent Applications | | |
| --- | --- | --- |
| Ser. No. | Filed | Title |
| 11/212,322 | Aug. 25, 2005 | Millimeter Wave Communication with Grid Amplifier |
| 11/249,787 | Oct. 12, 2005 | Mobile Millimeter Wave Communication Link |
| 11/327,816 | Jan. 06, 2006 | Wireless System with Free Space Millimeter Wave Trunk Line |
| 11/452,631 | Jun. 13, 2006 | Wireless Millimeter Wave Communication System with Mobile Base Station |
| 12/004,578 | Dec. 24, 2007 | Wireless Communication System w/ Lens-Based Transceiver |
| 12/911,797 | Jan. 29, 2008 | Cellular Systems with Distributed Antennas |
| 12/080,709 | Apr. 03, 2008 | Cellular Communication System with High Speed Content Distribution |

To achieve higher data rates (such as OC-48 operating at 2.488 Gigabits per Second (Gbps)), applicant previously developed a radio using Quaternary Phase Shift Keying (QPSK) and a radio architecture using Up-converters and Down-converters, as described in FIG. 2, and previously disclosed in a patent application Ser. No. 11/452,631 which has been incorporated herein by reference. Applicant believes that other companies have also tried to develop radios with a similar architecture, but they are not aware of any radios operating at data rates as high as 2.488 Gbps which are being sold by other companies. Applicant believes that part of the reason for this might be that the cost of building a high data rate radio with this architecture is high. In the embodiment shown in FIG. 2, the transceiver transmits radiation centered at the 73.5 GHz millimeter wave frequency, and receives radiation centered at the 83.5 GHz millimeter wave frequency. A paired transceiver which communicates with the transceiver shown receives at 73.5 GHz and transmits at 83.5 GHz. All of the transceiver modules are identical for the two paired transceivers, except that the local oscillator and mixer module frequencies are reversed. This transceiver is compatible with phase shift keyed modulation, and amplifiers and high power amplifiers which can operate near saturation.

Digital data at a data rate of 2.488 Gbps (corresponding to fiber optic communications standard OC-48) is incident through a fiber optic cable as indicated at 401 to the Demark (Demarcation) box 400 on the left. Power is also supplied to this box, either at 48 V DC, or 110 or 220 V AC. This power is first converted to 48 V DC, and then the power is converted to low voltage DC power of various values such as +/−5V and +/−12 V by DC to DC power supplies for use by the various modules in the transceiver. The incoming 2.488 Gbps data then enters the Encoder module 402 where it is encoded in a format appropriate for QPSK modulation. If no error correction or auxiliary channel bits are desired, the incoming data is demultiplexed (on alternate bits) into two data streams at 1.244 Gbps. If error correction, encryption, or the addition of auxiliary channel bits are desired, these are added at this point resulting in two data streams at a slightly higher data rate. Bits from each data stream are then combined to form a dibit, and subsequent dibits are compared (essentially through a 2 bit subtraction process) to from an I and Q data stream which differentially encodes the incoming data. The I and Q data streams (at 1.244 Gbps if extra bits have not been added) drive a 4 phase modulator 404 which changes the phase of a 13.312 GHz oscillator signal. The output of the 4 phase modulator is a signal at 13.312 GHz as indicated at 404 which has its phase changed through 4 different possible phase values separated by 90 degrees at a baud rate of 1.244 Gbps. The amount of rotation from the previous state depends on the incoming digital dibit. (A 00 corresponds to no phase change, 01 to 90 degree phase change, 10 to 180 degree phase change and 11 to 270 degree phase change). The 13.312 GHz modulated oscillator signal is then combined with a 60.188 GHz local oscillator signal in mixer 406 to form a signal centered at 73.5 GHz. As indicated at 408 the local oscillator utilizes a phase locked dielectric resonant oscillator (PLDRO) signal at 10.031 GHz which has been multiplied in frequency by a factor of 6. The 73.5 GHz signal is then amplified to a power near 20 dBm (100 mw) by a first amplifier module 410, and then (optionally) amplified to a power near 2 W by a power amplifier 412. The amplified signal enters a frequency division diplexer 414 which routes the 73.5 GHz frequency band to an output waveguide, past a power detector 416 (to measure the transmit power) and then to a parabolic 2 foot diameter antenna 418 for transmission along a line of sight through free space to the paired transceiver.

At the same time, incoming millimeter wave radiation centered at 83.5 GHz transmitted by a paired transceiver (not shown) is received at the two foot parabolic antenna 418 and passes through the waveguide to the frequency division diplexer. The 83.5 GHz radiation is passed by the diplexer to the lower arm of the diagram in FIG. 2. It is then amplified by low noise amplifer 419 and mixed in mixer 422 with the signal from a local oscillator 420 operating at 10.188 GHz. The 71.188 GHz frequency is generate by multiplying a signal from a phase locked dielectric resonant oscillator (PL-DRO) locked to a frequency of 11.698 GHz by a factor of 6 (through a times 2 and a times 3 multiplier). The output of mixer 422 is a signal centered at 13.312 GHz which is filtered and amplified by the IF Amplifier module 424. The receive signal strength is also measured at this stage. After further amplification and filtering, the incoming 13.312 GHz signal enters the demodulation and phase locked loop module 426 where the I and Q digital data streams are extracted. The I and Q data streams at 1.244 Gbaud then enter the decoder module where the 2.488 Gbps data stream sent from the paired transceiver is reconstructed. Decoder 402 basically computes the difference between sequential pairs of I and Q data, which corresponds to the dibits originally encoded at the paired transceiver. (The I and Q are related to the phase of the incoming signal with some ambiguity, but the difference in phase is known. If the phase has changed by 0 degrees, then the transmitted dibit was 00, 90 degrees corresponds to 01, 180 degrees corresponds to 10 and 270 degrees corresponds to 11). The decoded dibits are then remultiplexed into a 2.488 Gbps data stream for transmission to the demark box 400 and then through fiber optic cable 401 to the user.

The radio systems described above include state of the art systems and work well but are complicated and somewhat costly to fabricate. What is needed is a less complicated very high data rate millimeter wave radio system.

SUMMARY OF THE INVENTION

The present invention provides improved millimeter wave radios links. Preferred embodiments operate in the E-band spectrum consistent with the FCC rules regulating the 71-76 GHz and 81-86 GHz bands. Each of the two radios in the link uses a single aperture to transmit radiation in one of the two bands, and receive radiation in the other of the bands. The counterpart radio used to form a link preferably is almost identical, except for the interchange of the transmit and receive frequencies.

A preferred embodiment utilizes a modulation scheme in which the radios each receive on-off keyed data and transmits the on-off keyed data encoded in a millimeter wave carrier wave. In a special preferred embodiment the encoding is accomplished with binary phase shift keying. In a second technique the output signal is generated using simple on-off keying whereby the transmit power is turned on and off at a baud rate corresponding to the data rate. The radio systems of these preferred embodiments can utilize dish antennas or a lens based antennas.

FCC Specifications

The FCC specifications define a minimum 3 dB divergence angle of 1.2 degrees, a minimum antenna gain of G=43 dBi, sidelobe reduction between 1.2 degrees and 5 degrees of 28 dB, and sidelobe reduction of 35 dB between 5 and 10 degrees off axis, relative to peak. (There are further sidelobe reduction requirements at larger angles). A lens based transceiver can meet the sidelobe requirements at a smaller size than a more commonplace parabolic reflector based transceiver because there is no central obscuration. The design of the feedhorn which illuminates the lens is critical because it determines the size of the intensity distribution on the lens. If the spot size on the lens is too small, the divergence will be too large, and the main sidelobe will not meet the required FCC mask at 1.2 degrees. If the spot size on the lens is too large, the divergence will be smaller, but there will be larger sidelobes between 5 and 10 degrees, and interference with the FCC mask in that region. The sidelobes are measured in both the horizontal and vertical direction, and the polarization should be in the horizontal or vertical direction. The minimum size lens, and thus the minimum size package, will be achieved if the pattern from the feedhorn is approximately the same in both directions, one of which is called the E-plane and one of which is called the H-plane.

Applicants New Radios

To meet customer demand for high data rate, lower cost, more reliability and ease of installation, Applicants have designed four versions of a better millimeter wave radio system. The system includes four important improvements which are the combination of two improved antenna designs and two variations of the millimeter wave electronics. Both electronics versions provide special high data rate modulation techniques. These four improvements are briefly described below:

First Electronic Version—Binary Phase Shift Keying (BPSK)

Applicants have designed a radio which operates in the 71-76 and 81-86 GHz bands. One radio in a complete link transmits in the 71-76 GHz band and receives in the 81-86 GHz band. The other paired radio in the link transmits in the 81-86 GHz band and receives in the 71-76 GHz band. Within the radio the transmit and receive radiation are separated with a frequency division diplexer. The transmit frequency is formed by starting with a very accurate lower frequency source, and multiplying that up to approximately 73.5 or 83.5 GHz. The data to be transmitted is modulated onto the RF transmit radiation by modulating the outgoing phase between two states which are approximately 180 degrees apart. The modulation is accomplished with a mixer, and we have demonstrated modulation speeds up to 3.1 Gbps and believe the technique can easily be extended to 5 Gbps or higher. Before modulation onto the RF transmit radiation, the data to be transmitted is encoded in such a way that if a "1" is to be transmitted the phase of the outgoing signal is changed by 180 degrees, but if a "0" is to be transmitted the phase of the outgoing signal is left unchanged from its previous value. The encoder consists of an XOR gate (exclusive or) combined with a delay line of length corresponding to a bit period. The modulated signal is then amplified to a power of about 100 mW and sent to the diplexer for transmission across the link. At the receive end the incoming radiation is separated by the diplexer, and then amplified by a sensitive amplifier chain. The data is demodulated and decoded simultaneously at the RF frequency by using a mixer with a delay line of length corresponding approximately to a bit period, but being carefully tailored to be exactly an integer or half integer number of RF periods in length. Basically the receive signal is mixed with the receive signal from one bit period earlier. If the phase was unchanged, the two signals multiply together as a "V" in the mixer, where V corresponds to some voltage. If the phase was changed, the two signals multiply together as a "−V" in the mixer. The value V is then assigned to be a digital "0" and the value −V is assigned to be a digital "1" in the outgoing signal which is provided to the user after clock recovery. If the delay lines are tailored for a data rate of 2.488 Gbps (corresponding to OC-48) the system will also work at subharmonics of this data rate (1.244 Gbps and nearby data rates such as 1.25 Gbps, gigabit Ethernet, etc.) We are calling a version of this radio tailored for the 2.488 Gbps data rate a Loea L1248 when coupled with the 10 inch lens, and a Loea L3248 when coupled with the two foot antenna. We are calling a version of this radio tailored for the 3.072 Gbps data rate (used in cellular fronthaul applications) a Loea L 1100 when coupled with the 10 inch lens, and Loea L3100 when coupled with the two foot antenna.

First Antenna Design—Lens Type

Applicants have designed a system with a lens smaller than 10 inches in diameter. The feedhorn, a pyramidal horn, is designed to provide approximately even illumination in both the horizontal and vertical plane, simultaneously at both the 71-76 and 81-86 GHz bands. It provides a spot size on the lens in about the middle of the range over which we expect to meet the FCC side lobe specification. Preliminary measurements indicate that we will meet them.

Second Antenna Design—Two-Foot Mirror

We have designed a system with a parabolic mirror which is 2 feet in diameter. A feedhorn illuminates a hyperboloidal secondary mirror, and the radiation reflected from the secondary mirror illuminates the primary parabolic mirror. The outgoing reflection from the parabolic mirror is approximately collimated with a divergence of about half a degree. The same antenna can be used for both transmit and receive. The feedhorn, a pyramidal horn, is designed to provide approximately even illumination in both the horizontal and vertical plane, simultaneously at both the 71-76 and 81-86 GHz bands. The secondary mirror is supported by a radome which is transparent to the millimeter wave radiation.

Second Electronic Version—on-Off Keying, Continuous Range of Data Rates

We have designed a radio which operates in the 71-76 and 81-86 GHz bands. One radio in a complete link transmits in the 71-76 GHz band and receives in the 81-86 GHz band. The other paired radio in the link transmits in the 81-86 GHz band and receives in the 71-76 GHz band. Within the radio the transmit and receive radiation are separated with a frequency division diplexer. The transmit frequency is formed by starting with a very accurate lower frequency source, and multiplying that up to approximately 73.5 or 83.5 GHz. The On-Off keyed data to be transmitted, typically at data rates between 45 Mbps and 1.5 Gbps, is then modulated directly onto that 73.5 or 83.5 GHz RF frequency. The signal is then amplified to a power of about 100 mW and sent to the diplexer for transmission across the link. At the receive end the incoming radiation is separated by the diplexer, and then amplified by a sensitive amplifier chain. After amplification, it is mixed with an accurate lower frequency source in a harmonic mixer to result in an Intermediate Frequency of about 3 GHz. The data is then demodulated from this Intermediate Frequency. A clock recovery circuit that can tune to any data rate between 45 Mbps and 1.5 Gbps is then used to regenerate the data accurately before it is sent to the user, typically over a fiber optic connection. When combined with the First Antenna Design above, the 10 inch lens, we call this product a Loea L1000 system. When combined with the Second Antenna Design above, the 2 foot parabolic reflective antenna, we call this product a Loea L2700 system.

DETAILED DESCRIPTION OF PREFERRED EMBODIMENTS

First Electronic Version

Binary Phase Shift Keyed Millimeter Wave Radio System

Figure 2:
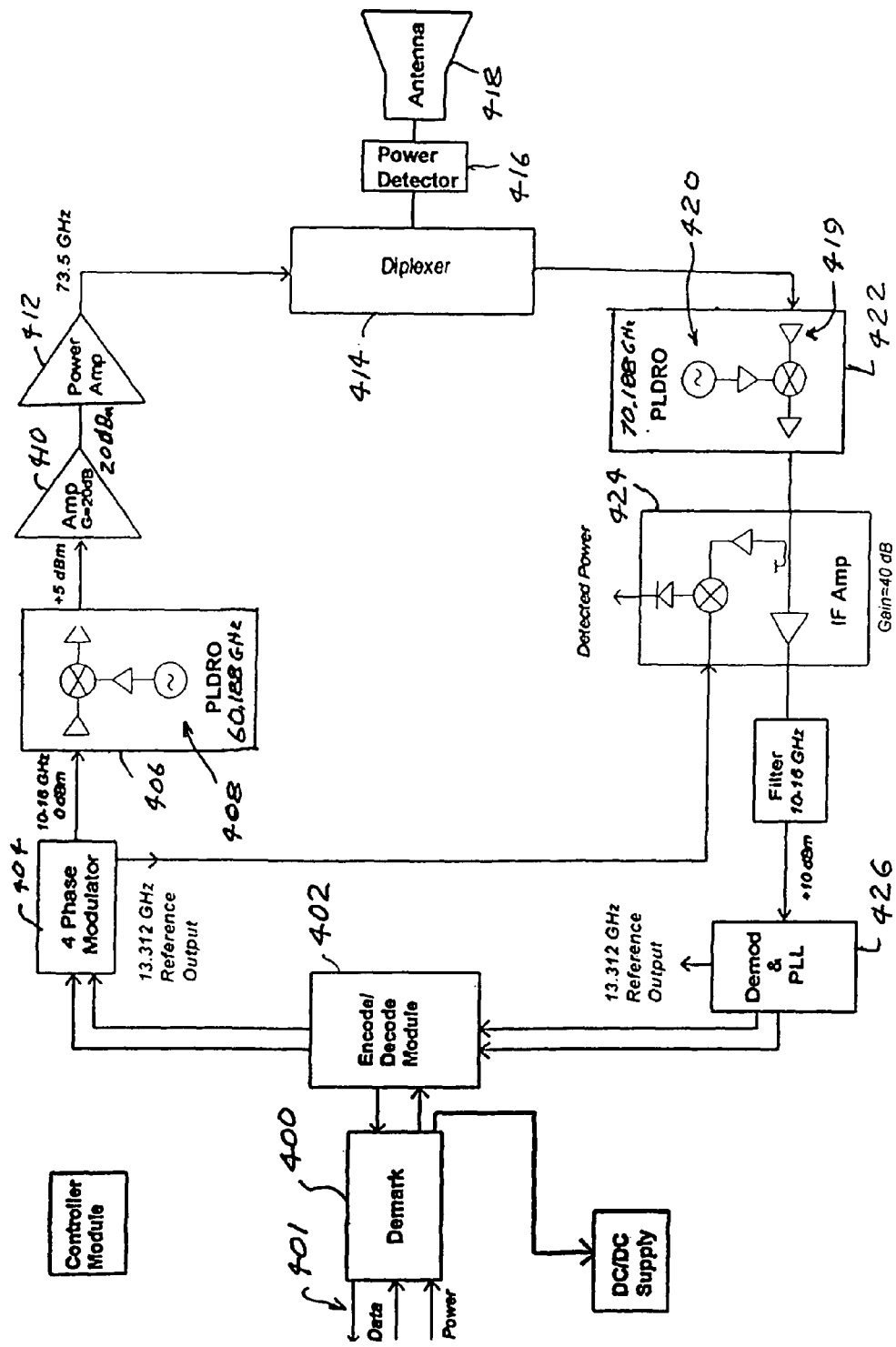
FIG. 2 describes a QPSK millimeter wave radio.
Figure 3:
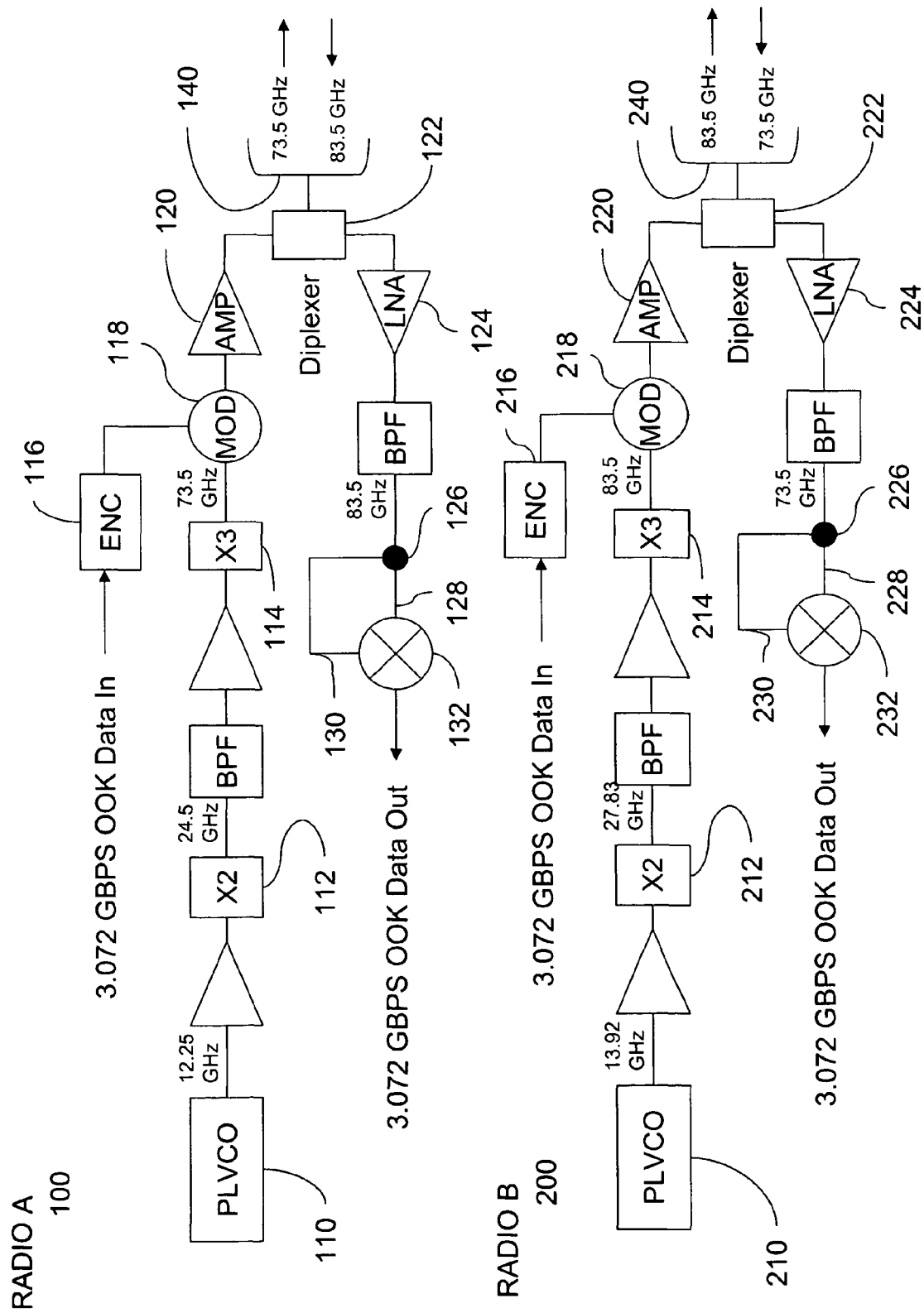
FIG. 3 describes important features of a preferred embodiment of the present invention.

FIG. 3 shows a preferred embodiment of the Binary Phase Shift Keyed (BPSK) millimeter wave radio system of the present invention. Many radio features which are well known in the art, and described in the Background of the Invention with regard to the QPSK radio of FIG. 2 are not repeated here, such as the use of a fiber optic data interface, a Demarcation box, and various possible drive voltage scenarios. The emphasis of the invention described here is the particular method used to modulate high bit rate data onto the millimeter wave carrier at the transmitter, and to reconstruct the high bit rate data at the receiver with high fidelity at minimum cost. The key to this invention is that the data can be retrieved from the phase shift modulated carrier using a very simple and inexpensive delay line which compares the phase of the received millimeter wave signal at times separated by the bit period. A further key to this invention is that with a single receiver delay line, the system can accommodate a large range of input data rates covering the most important standards so that it is not necessary to manufacture multiple versions of the radio system operating at different data rates. Particular standards which can be accommodated with a single radio system include OC-12 at 622 Megabits per second (Mbps), Gigabit Ethernet at 1.25 Gigabits per second (Gbps), OC-48 at 2.488 Gbps, and OBSAI standards at 1.536 and 3.072 Gbps. Applicant has demonstrated a radio (the Loea L 1100) operating in a manner similar to the preferred embodiment presented here, and is currently getting the radio system certified by the FCC. (Some of the internal frequencies are slightly different). Although the system being certified is designed for operation at 71-76 GHz and 81-86 GHz, the modulation and demodulation technique is general and can be used at any millimeter wave frequency (and other frequencies as well). The technique works best at higher frequencies and higher data rates because the number of millimeter wave periods in the receive delay line is then minimized, the required tolerances are lower, and the range of operational data rates is higher.

Figure 4:
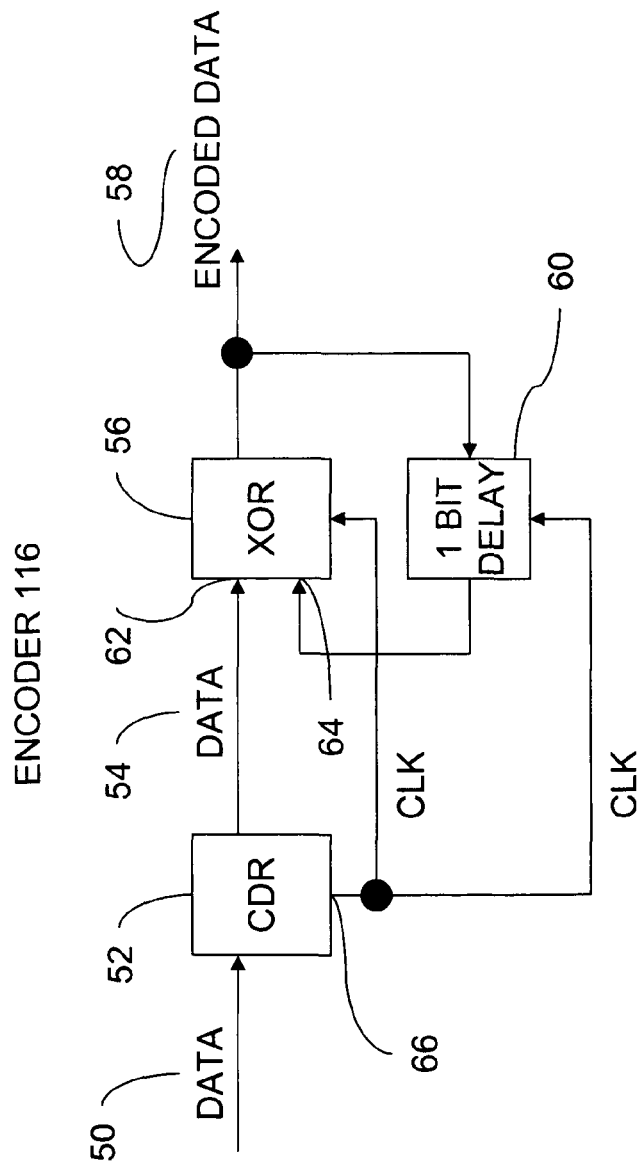
FIG. 4 shows a BPSK Encoder and truth table.

Referring to FIG. 3, Radio A 100 is designed to communicate over free space with Radio B 200. Radio A and B are generally identical except for differences in internal frequencies and time delays to accommodate use of the 71-76 GHz frequency band for communication from Radio A to Radio B, and the 81-86 GHz frequency band for communication from Radio B to Radio A. The central carrier frequency onto which data is modulated for the 71-76 GHz band is at 73.5 GHz, and the central carrier frequency onto which data is modulated for the 81-86 GHz band is at 83.5 GHz. The identical parts for the two radios are designated with the same last two digits, for example PLVCO 110 on radio A corresponds to PLVCO 210 on radio B. Referring then to Radio A 100, Phase Locked Voltage Controlled Oscillator (PLVCO) 110 generates a frequency stabilized microwave output at 12.25 GHz. The frequency is doubled to 24.5 GHz by Times 2 Frequency Multiplier 112, then sent through a band pass filter and amplifier, and then tripled to the 73.5 GHz millimeter wave carrier frequency by Times 3 Frequency Multiplier 114. Although the method described here for generating the millimeter wave carrier frequency provides a stable and reliable source, those skilled in the art will know of other methods for generating this carrier, including starting with different frequencies and multiplying by different amounts, or generating a carrier directly with an oscillator at 73.5 GHz. The only critical feature is that the frequency be stable enough such that the data demodulation method using a delay line in the receiver functions properly. Incoming user data to be transmitted across the link enters through a fiber optic, is converted to an on-off keyed electrical signal, and then encoded by Encoder 116. Encoder 116 is described more fully in FIG. 4. (Encoder 216 for the B radio operates by the same method as Encoder 116 for the A radio). The incoming 3.072 Gbps Data 50 first passes through Clock and Data Recovery (CDR) circuit 52 to remove timing jitter from the output Data 54, and to generate a Clock Signal 66. The encoder can work without a clock signal by using a fixed time delay, but this limits the operational data rate of the system. Data 54 is now encoded by using an Exclusive Or (XOR) gate and a Delay Generator, which are clocked at a 3.072 Gbps baud rate by Clock Signal 66. The Exclusive Or gate and Delay Generator provide a simple way to encode the data in the desired manner. Other methods can also be used (such as a programmable logic array), and the important aspect of the invention is that the data be encoded such that when applied to the modulator, one kind of incoming data bit (say a digital "1") causes a change in phase of the carrier, and the other kind of incoming data bit (say a digital "0") does not cause a change in phase of the carrier. In the preferred embodiment described here, a particular bit of Data 54 is compared with the previous output of Encoder 166, namely Encoded Data 58 in Exclusive OR gate 56. The previous output of Encoder 166 is accessed by using a 1 Bit Delay 60 (which could be a flip-flop or similar electronic circuit). Data 54 enters through XOR Input 62, and Previous Encoded Data 58 enters through XOR Input 64. Clock 66 is used to maintain timing coincidence between the different bits. There is an important aspect of Clock Signal 66 that allows the system to work at sub-harmonics of the data baud rate designed into the Receive Delay Line. Clock Signal 66 is constrained by CDR circuit 52 to be within some range of the design Baud Rate (say 2.488 Gbps to 3.072 Gbps). If data comes in at a lower sub-harmonic data rate, say 1.25 Gbps corresponding to Gigabit Ethernet, then Clock Signal 66 will be generated at 2.5 Gbps (an integer multiple of the incoming data rate). Similarly, an incoming data rate of 622 Mbps will result in a Clock Signal and Baud rate at 2.488 Gbps (the fourth harmonic). By doing this, the lower incoming data rate will appear to the rest of the system as if it is a higher data rate with repeating bits (for example 10111001 at 1.25 Gbps will look like 1100111111000011 at 2.5 Gbps and be reconstructed correctly). A truth table for Encoder 116 is given at the bottom of FIG. 4. If the new data bit is a "1", then the Encoded Data bit is toggled (from a 0 to a 1, or a 1 to a 0). If the new data bit is a "0", then the Encoded Data bit is left unchanged (from a 0 to a 0, or a 1 to a 1).

Returning now to FIG. 3, the encoded data bit from Encoder 116 is used in Phase Shift Diode Modulator 118 to modulate the phase of the 73.5 GHz millimeter wave carrier signal. If the Encoded Bit is a 1, a first carrier phase is chosen. If the Encoded Bit is a 0, a second carrier phase which is 180 degrees out of phase with the first carrier phase is chosen. This modulation method is called Binary Phase Shift Keying (BPSK). It results in slightly better radio performance than On-Off Keying because the average transmit power is twice as high, and the amplifiers and other components can operate at slightly higher power (to saturation) and over a higher dynamic range than for On-Off Keying, which is an analog modulation requiring more component linearity. After leaving Modulator 118, the modulated 73.5 GHz millimeter wave signal passes through Amplifier 120 (typically generating a power of about 200 mW) and then through Frequency Division Diplexer 122 to be transmitted from Antenna 140.

After propagating through free space, the modulated 73.5 GHz millimeter wave signal transmitted by Antenna 140 on Radio A 100 is received by Antenna 240 on Radio B 200. The 73.5 GHz signal is then directed by Frequency Division Diplexer 222 to Low Noise Amplifier (LNA) 224 where it is amplified and sent through a Band Pass Filter (BPF) to reduce out of band noise. The amplified received signal is then divided in two parts by Splitter 226 (which is typically just a branched line on a millimeter wave circuit board) and sent to two inputs of Mixer 232 via Propagation Path 228 and Propagation Path 230 which vary in length by a set amount causing a fixed time delay between the parts of the signal arriving at the mixer along the two different paths. This time delay is set to be approximately one bit period at the baud rate. A baud rate half way between standard data rates of 2.488 Gbps (OC-48) and 3.072 Gbps (OBSAI) is 2.78 Gbps, and the corresponding bit period time is 359.7 psec. Although the time delay should correspond approximately to a bit period at the design baud rate, it needs to correspond more critically to an integer or half integer number of periods of the underlying carrier frequency of 73.5 GHz in order for the mixer to regenerate the original 3.072 Gbps data presented to Encoder 116. This can be understood more fully by reference to FIG. 5.

Imagine an incoming data bit stream at 3.072 Gbps consisting of the 8 data bits 10111001, with each bit lasting for a period of 325.5 psec (the reciprocal of 3.072 GHz). If the previous Encoded Bit was a 1, these 8 data bits result in an encoded bit stream of 100101110, where the encoded bit changes for a data bit of 1, and remains unchanged for a data bit of 0. The 1's and 0's in the encoded bit stream correspond to the two different phases of the transmitted 73.5 GHZ millimeter wave. In FIG. 5A, a portion of the electric field versus time for the millimeter wave signal is shown from a time of 900 psec to a time of 1700 psec. Phase changes can be seen at 976 psec, 1302 psec, and 1628 psec corresponding to the 3 consecutive 1's in the original data bit stream.

Figure 5:
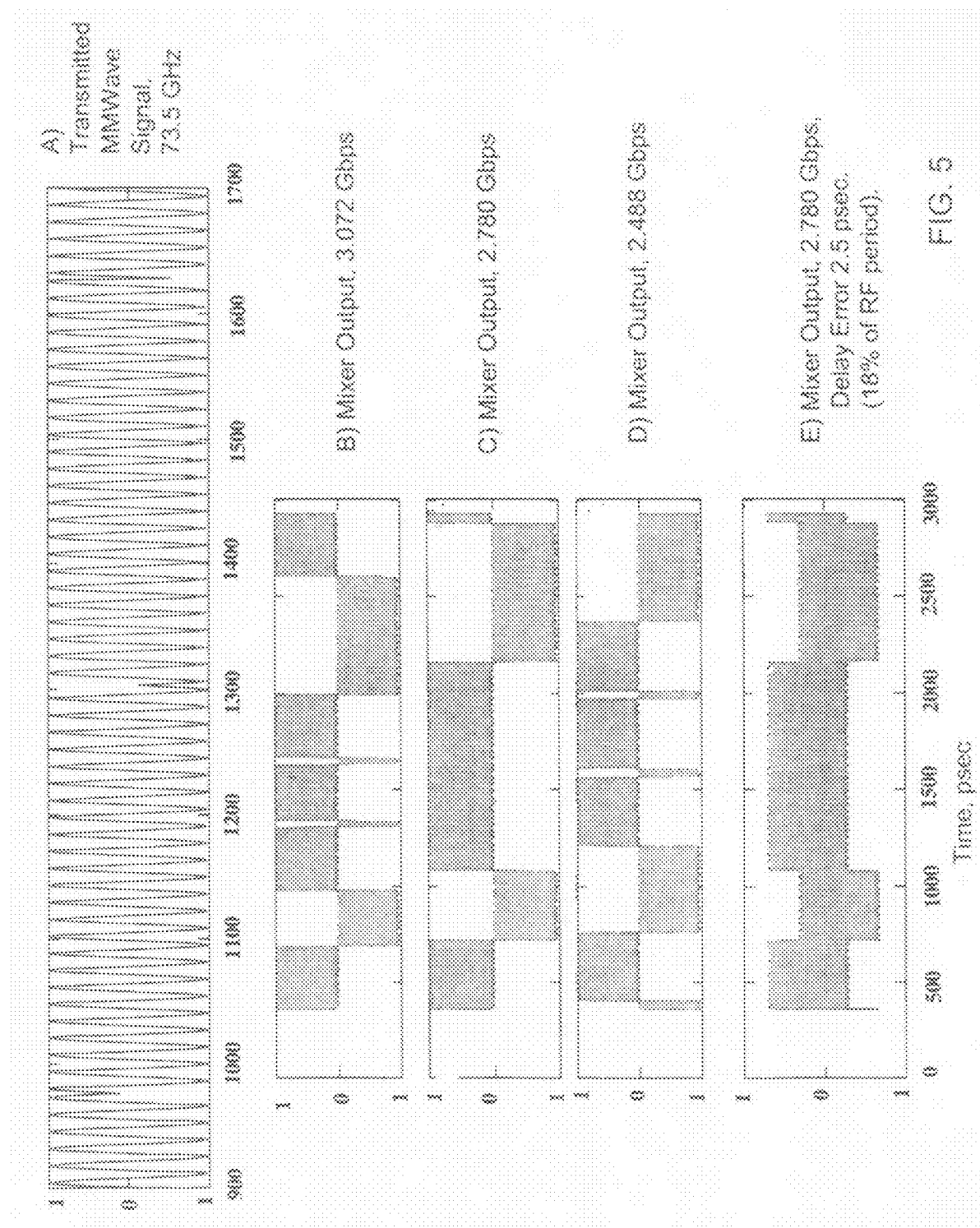
FIG. 5 shows BPSK RF waveform and decoder outputs.

At the mixer, the received signal is mixed with a delayed copy of the received signal. In principal, one mixer output will be at base band and the other will be at twice the millimeter wave carrier frequency. In FIG. 5, the multiplicative product of the received signal (coming over propagation path 230) and the delayed received signal (coming over propagation path 228) is shown. No account has been taken in these diagrams for the effect of bandwidth filtering in various parts of the radio system. FIG. 5B shows the multiplied output for the incoming data stream at 3.072 Gbps, but with the delay time optimized near 2.78 Gbps at 360.5 psec, corresponding to 26.5 millimeter wave periods. The large chunks of the signal which are above and below the central value correspond to the original data bits 10111001, and can easily be extracted by a standard Clock and Data Recovery (CDR) circuit. The thin sections of signal will be discriminated against, and ignored. For FIG. 5C, the incoming data baud rate has been changed to 2.78 Gbps corresponding to the design delay time in the receiver, and the spurious signals disappear. In FIG. 5D, the other end of the desired data rate range at 2.488 Gbps is passed through the receiver, and again the CDR circuit will be able to remove the spurious signals and recover the original data, allowing the radio to work over a range of data rates. In addition, if the original data was at a rate corresponding to the range of allowable baud rates divided by an integer (for example from 1.244 to 1.536 Gbps, corresponding to 2.488 Gbps to 3.072 Gbps divided by 2), the data will still be recovered correctly provided that the Clock 66 in Encoder 166 operates at a baud rate which is the data rate multiplied by that same integer.

FIG. 5E shows the effect at the mixer of changing the delay time between Propagation Path 214 and Propagation Path 228 from 360.5 psec to 358 psec, a change of 18% of the 13.6 psec period of the 73.5 GHz carrier. In this case the original digital data can still be recovered, but the modulation depth is not as great. If the time delay is changed to 357 psec (corresponding to 25% of the carrier period), then the original signal can no longer be recovered. This places a constraint on the accuracy of the time delays and on the accuracy of the carrier frequency. Note, however, that the receiver circuitry can be made to work with a delay near any half integer multiple of the carrier period, for instance 26.5 periods as here, or 26 periods, 27 periods, etc. For a delay time which is a full integer instead of a half integer, the output voltage from the mixer simply corresponds to a different bit polarity (V=1, −V=0 changes to V=0, −V=1).

Second Electronic Version

On-Off Keyed Modulation of Transmit Beam

Figure 1:
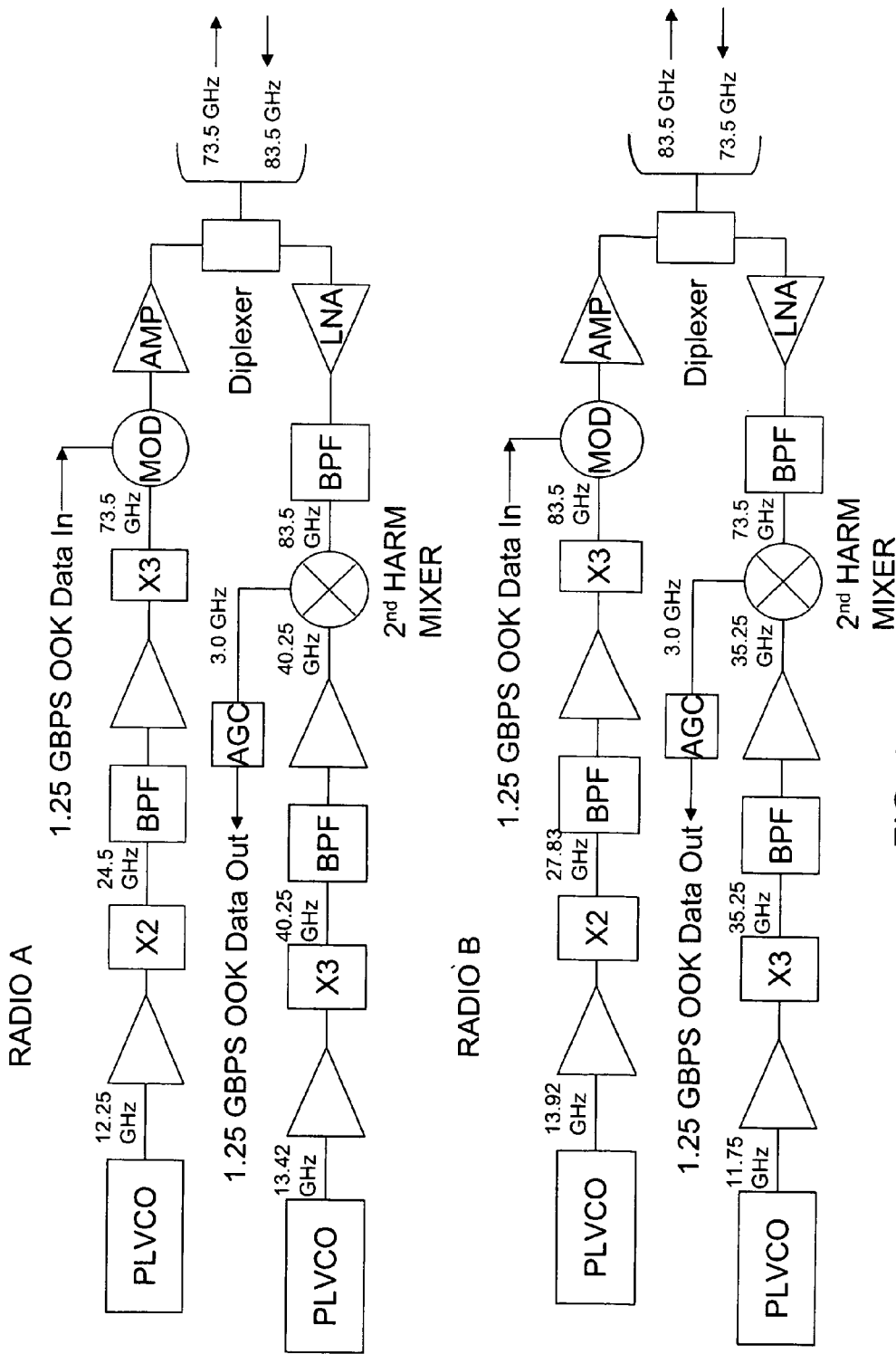
FIG. 1 describes an on-off keyed millimeter wave radio.

Preferred embodiments of radios built and operated by Applicants achieve data rates of up to 1.5 Gbps (1.25 Gbps being a standard gigabit Ethernet rate) using simple On-Off Keying, whereby the transmitted millimeter wave power is turned on and off at a baud rate (also known as a symbol rate) corresponding to the data rate. FIG. 1 is a block diagram showing how a L1000 radio system operates. A Phase Locked Voltage Controlled Oscillator (PLVCO) generates a stable starting frequency of 12.25 GHz (for the A radio) or 13.92 GHz (for the B radio), where an A radio communicates with a B radio across free space to form a communications link or system. These starting frequencies are then multiplied by a factor of 6 (using a times 2 multiplier and a times 3 multiplier) to generate a millimeter wave (or RF) carrier frequency at 73.5 GHz (A radio) or 83.5 GHz (B radio), in the center of the FCC allocated communications bands at 71-76 and 81-86 GHz. At this point, the data to be transmitted is modulated onto the carrier using a diode based switch, further amplified, and then sent into one port of a Frequency Duplexed Diplexer and output to an antenna. In the Loea L1000 this antenna is a 10 inch lens, and in a companion radio, the Loea L2700, this antenna is a 2 foot parabolic dish. After transmission through free space (typically over a distance between 500 m and 10 km), some portion of the transmitted signal is collected by a second antenna. Signals transmitted by the A radio in the 71-76 GHz band are received by the B radio, and signals transmitted by the B radio in the 81-86 GHz band are received by the A radio. Received signals are sent from the antenna to the Frequency Duplexed Diplexer, where they are separated from the transmitted signals. After passing through a Low Noise Amplifier (LNA) and a Band Pass Filter (BPF), they are mixed with a Local Oscillator (at 35.25 GHz for the 73.5 GHz signal, and 40.25 GHz for the 83.5 GHz signal) and down-converted to approximately 3 GHz in a Second Harmonic Mixer. The 3 GHz down-converted signal undergoes Automatic Gain Control (AGC) and is demodulated to retrieve the original high bit rate data stream.

Variations

While the above description contains many specifications, the reader should not construe these as a limitation on the scope of the invention, but merely as exemplifications of preferred embodiments thereof. For instance, many different millimeter wave frequencies and corresponding delay times could be used effectively in the system for different applications. So far, we have described a high data rate, simplex millimeter wave link from Radio A to Radio B operating in the 71-76 GHz band. In many cases, only a uni-directional communications link is desired, and that is one preferred embodiment of the invention. It should be understood that such a system could also work very well in the unlicensed band from 57 GHz to 64 GHz. In many cases, a full duplex bi-directional communications link is desired. In that case, the preferred embodiment would add the other components shown in FIG. 3 which constitute a communications link in the 81-86 GHz band from Radio B 200 to Radio A 100. Specifically, PLVCO 210 generates a microwave signal at 13.92 GHz which is multiplied to 27.83 GHz by Times 2 Multiplier 212 and to 83.5 GHz by Times 3 Multiplier 214, where it is modulated by Modulator 218 using encoded data from Encoder 216. After amplification by Amplifier 220 the modulated 83.5 GHz signal is directed by Frequency Division Diplixer 222 to Antenna 240 for propagation through free space to Antenna 140. The received signal at Radio A 100 is then directed by Diplexer 122 to LNA 124, through a BPF, and then to Splitter 126 for propagation over paths 128 and 130 with different path delays to Mixer 132 where the data stream provided to Radio B is regenerated for the user connected to Radio A. Many kinds of Antenna can be used. In particular, Applicant's subsidiary Loea sells systems with a 10 inch lens Antenna (designated L1000 for the OOK system at 1.25 Gbps and L1100 for the BPSK system at 3.072 Gbps) and a 2 foot parabolic dish Antenna (designated L2700 for the OOK system at 1.25 Gbps, and L3100 for the BPSK system at 3.072 Gbps). Accordingly, the reader is requested to determine the scope of the invention by the appended claims and their legal equivalents, and not by the examples given above.

What is claimed is:

1. A variable data rate binary phase shift keying (BPSK) millimeter wave radio communications system comprising:
    A) a transmitter adapted to receive on-off keyed (OOK) data at a data rate and to transmit BPSK encoded data at a baud rate using a millimeter wave carrier at a millimeter wave frequency, said transmitter comprising:
        1) a frequency stabilized millimeter wave source operating at said millimeter wave frequency;
        2) an encoder having an output clocked at said baud rate and adapted to encode said data such that the output is equal to the Exclusive Or (XOR) of said OOK data and said output; and
        3) a modulator adapted to apply the output of the encoder to the millimeter wave carrier as a BPSK signal;
        wherein said data rate is approximately equal to the baud rate divided by an integer n, where n=1, 2, 3 . . . and
    B) a receiver adapted to receive a millimeter wave signal transmitted from the transmitter comprising:
        1) a millimeter wave amplifier adapted to amplify said received millimeter wave signal;
        2) a splitter adapted to split said amplified signal;
        3) a mixer defining two mixer inputs and a mixer output; and
        4) a circuit defining two propagation paths from said splitter to each of said two mixer inputs with different path lengths defining a signal time delay;
        wherein said signal time delay is approximately equal to the reciprocal of said baud rate, and equal to a half integer multiple of the reciprocal of said millimeter wave frequency to within 25% of the reciprocal of said millimeter wave frequency; and
        wherein said output reproduces said OOK data provided to said transmitter.

2. The system as in claim 1 wherein said millimeter wave frequency is above 57 GHz.

3. The system as in claim 1 wherein said millimeter wave frequency is between 71 and 76 GHz.

4. The system as in claim 1 wherein said millimeter wave frequency is between 81 and 86 GHz.

5. The system as in claim 1 wherein said data rate is above 500 Mbps.

6. The system as in claim 1 wherein said baud rate is between 2.488 Gbps and 3.072 Gbps.

7. The system as in claim 1 wherein said millimeter wave frequency is approximately 73.5 GHz and further comprising a second system as in claim 1 wherein said millimeter wave frequency is approximately 83.5 GHz.

8. The system as in claim 7 wherein said baud rate is 3.072 Gbps.

9. The system as in claim 7 wherein said baud rate is 2.488 Gbps.

10. The system as in claim 9 wherein said data rate is 2.488 Gbps.

11. The system as in claim 7 wherein said signal time delay for the 73.5 GHz system is approximately equal to 360.5 psec (26.5 millimeter wave periods at 73.5 GHz) and said signal time delay for the 83.5 GHz system is approximately equal to 359.3 psec (30 millimeter wave periods at 83.5 GHz).

12. The system as in claim 11 wherein said data rate is 1.25 Gbps and said baud rate is 2.50 Gbps.

13. A method for communicating at a millimeter wave frequency using binary phase shift keying (BPSK) comprising the steps of:
    A) presenting to a radio transmitter at a first location raw data of a certain data rate to be transmitted;
    B) encoding said raw data at a baud rate which is an integer multiple of said data rate such that a bit of said encoded data is equal to the Exclusive Or (XOR) of said raw data and the previous bit of said encoded data;
    C) binary phase shift key (BPSK) modulating a millimeter wave carrier with said encoded data;
    D) amplifying said modulated carrier;
    E) transmitting said amplified modulated carrier through free space to a millimeter wave receiver at a second location;
    F) amplifying the millimeter wave signal received by said millimeter wave receiver;
    G) splitting said amplified received signal onto two paths with propagation lengths causing a relative time delay; and
    H) multiplying together the millimeter wave signals propagating on said two paths in a mixer to recover said raw data originally presented to the transmitter;
        wherein said time delay is approximately equal to the reciprocal of said baud rate and wherein said time delay is equal to a half integer multiple of the reciprocal of said millimeter wave frequency to within 25% of the reciprocal of said millimeter wave frequency.

14. The method as in claim 13 wherein said millimeter wave frequency is above 57 GHz.

15. The method as in claim 13 wherein said millimeter wave frequency is between 71 GHz and 86 GHz.

16. The method as in claim 13 and further comprising a step of transmitting a millimeter wave signal from the second location to the first location.

17. The method as in claim 13 wherein said millimeter wave frequency is 60 GHz.

18. The method as in claim 17 wherein said data rate is 1.25 Gbps, said baud rate is 2.5 Gbps, and said time delay is 400 psec (24 millimeter wave periods at 60 GHz).

19. A system for communicating a data stream at a millimeter wave frequency using binary phase shift keying (BPSK) comprising:
   a. an encoder and modulator for applying a 180 degree phase shift on a millimeter wave signal to be transmitted if an incoming bit from said data stream is a "1", while leaving the phase of said millimeter wave signal to be transmitted unchanged if an incoming bit from said data stream is a "0";
   b. a power amplifier for amplifying said millimeter wave signal to be transmitted;
   c. an antenna system for transmitting said amplified millimeter wave signal through free space;
   d. an antenna system for receiving said transmitted millimeter wave signal;
   e. a low noise amplifier for amplifying said received millimeter wave signal;
   f. a two way splitter, two propagation paths of different length, and a mixer for comparing said received millimeter wave signal at two different times separated by a time delay to regenerate said data stream;
wherein said two different times are separated by approximately one bit period of said data stream, and wherein said two different times are approximately separated by a half integer multiple of the period of the transmitted millimeter wave signal.

* * * * *